United States Patent
Reuss

(10) Patent No.: US 10,184,535 B2
(45) Date of Patent: Jan. 22, 2019

(54) POLYMERIC BRAKE PISTON WITH REINFORCING CORE

(71) Applicant: AKEBONO BRAKE INDUSTRY CO., LTD, Chuo-ku, Tokyo (JP)

(72) Inventor: James Andrew Reuss, Farmington Hills, MI (US)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 15 days.

(21) Appl. No.: 15/285,630

(22) Filed: Oct. 5, 2016

(65) Prior Publication Data
US 2018/0094681 A1  Apr. 5, 2018

(51) Int. Cl.
*F16D 125/06* (2012.01)
*F16D 65/18* (2006.01)
*F16D 55/00* (2006.01)
*F16D 55/226* (2006.01)

(52) U.S. Cl.
CPC ............ *F16D 65/18* (2013.01); *F16D 55/226* (2013.01); *F16D 65/183* (2013.01); *F16D 2055/0016* (2013.01); *F16D 2055/0075* (2013.01); *F16D 2125/06* (2013.01)

(58) Field of Classification Search
CPC .............. F16D 55/2265; F16D 65/18; F16D 2055/0075; F16D 2200/0034; F16D 2125/06
USPC ...................................... 188/71.1, 72.4, 73.1
See application file for complete search history.

(56) References Cited

U.S. PATENT DOCUMENTS

| 4,193,179 | A  |   | 3/1980  | Confer et al. |
|-----------|----|---|---------|---------------|
| 4,354,423 | A  | * | 10/1982 | Ohmi .................... B60T 13/575 |
|           |    |   |         | 91/369.3 |
| 4,449,447 | A  | * | 5/1984  | Yanagi .................... B29C 70/68 |
|           |    |   |         | 188/264 G |
| 5,031,511 | A  |   | 7/1991  | Villata |
| 5,492,202 | A  | * | 2/1996  | Drotar ................. F16D 65/0006 |
|           |    |   |         | 188/72.4 |
| 5,826,686 | A  | * | 10/1998 | Rike ...................... F16D 55/228 |
|           |    |   |         | 188/264 G |
| 5,845,747 | A  |   | 12/1998 | Rike et al. |
| 6,085,636 | A  |   | 7/2000  | Rückert et al. |
| 6,382,367 | B1 | * | 5/2002  | Varzescu ................. F16D 65/18 |
|           |    |   |         | 188/72.7 |
| 6,401,596 | B1 | * | 6/2002  | Mashford ................ F16J 1/006 |
|           |    |   |         | 188/264 G |
| 6,443,048 | B1 | * | 9/2002  | Fischbach ................ F16J 1/006 |
|           |    |   |         | 92/222 |
| 6,443,049 | B2 | * | 9/2002  | Suga ........................ F16J 1/006 |
|           |    |   |         | 92/248 |

(Continued)

*Primary Examiner* — Thomas W Irvin
(74) *Attorney, Agent, or Firm* — The Dobrusin Law Firm, P.C.; Daniela M. Thompson-Walters

(57) ABSTRACT

A brake piston comprising a) an open end; b) a closed end; c) a piston cylindrical wall comprising a polymeric material which extends from the closed end to the open end; d) a core member comprising a metallic material located within the cylindrical wall which extends between the closed end and the open end without extending completely to the open end; and wherein the core member structurally reinforces the brake piston. The brake piston may find particular use in a disc brake assembly. The core member may be particularly useful for structurally reinforcing the brake piston when receiving and transferring a brake apply force.

20 Claims, 4 Drawing Sheets

(56) References Cited

U.S. PATENT DOCUMENTS

| | | |
|---|---|---|
| 6,629,587 B2 * | 10/2003 | Gravier .................. B60T 17/085 |
| | | 188/170 |
| 6,637,317 B1 | 10/2003 | Zeibig et al. |
| 7,000,526 B2 | 2/2006 | Bennett et al. |
| 8,348,030 B2 | 1/2013 | Alamin et al. |
| 8,561,762 B2 | 10/2013 | Schupska et al. |
| 9,267,557 B2 | 2/2016 | Boyle |
| 2016/0146345 A1 | 5/2016 | Koshikawa et al. |

* cited by examiner

POLYMERIC BRAKE PISTON WITH REINFORCING CORE

FIELD OF INVENTION

The present teachings generally relate to a brake piston and more particularly to a polymeric piston with a core member for structural reinforcement.

BACKGROUND

Typical brake pistons in a disc brake reside within one or more piston bores of a caliper. The brake pistons generally have a cylindrical shape with a closed end opposing an open end. The closed end is in contact with brake fluid and the open end is usually in contact with a brake pad. The vehicle typically has a master cylinder in connection with both a brake pedal and the brake piston. The master cylinder generally converts non-hydraulic pressure (i.e., depression of a vehicle brake pedal) into hydraulic pressure of the brake fluid acting on the brake piston. Depressing of a vehicle brake pedal results in brake fluid flowing from the master cylinder to the caliper which then results in increased pressure of the brake fluid applying a brake apply force to the closed end of the brake piston. The force on the brake piston from the brake fluid includes both axial force on the piston and radial force on the piston. The open end of the brake piston then pushes the brake pad against the brake rotor to transfer the brake apply force to the rotor and result in braking of the vehicle. Examples of such pistons are disclosed in U.S. Pat. Nos. 4,193,179; 6,637,317; and 7,000,526 all of which are expressly incorporated herein by reference for all purposes.

Historically, brake pistons were made of steel, so as to be sufficiently rigid to withstand the axial and radial forces of the brake fluid, the counter force of the brake pad during brake apply, and prevent degradation of the brake fluid. Metallic brake pistons have a high thermal conductivity, which transfers heat from the brake pads into the brake fluid, and during braking the brake fluid becomes hot and may boil. The heated brake fluid may result in a soft brake pedal feel as the brake fluid may become more compressible and a vehicle driver may need to depress the brake pedal a further distance to apply a braking force or the brake system may fail as no amount of brake pedal depression is able to apply sufficient hydraulic pressure to result in the brake pad stopping movement of the brake rotor.

To provide for improved heat dissipation and corrosion resistance, brake pistons have been manufactured from polymers, thermosets, or glass fibers. However, brake pistons made from polymers have a tendency to deflect upon axial forces and/or radial forces being applied. This piston deflection results in an increase in required brake pedal travel (i.e., brake pedal depression distance) to achieve brake clamping force. This increased brake pedal travel is dependent on the piston size, the brake system, the clamping force, and the designed piston stiffness. Piston deflection generally includes a piston axial reduction (i.e., reduction in brake piston's overall length) from about 0.03 mm to about 0.06 mm and a radial reduction (i.e., reduction in brake piston's outer diameter) from about 0.006 mm to about 0.012 mm when receiving from about 0 MPa to about 15 MPa of pressure from the brake fluid. Due to the brake piston deflection, a vehicle driver may feel reduced brake stiffness and/or a looser pedal feel as the brake piston deflects. Because of this reduced stiffness and looser pedal feel, a vehicle driver may perceive a lower quality braking system, and even vehicle. In order to achieve a tighter pedal feel with a standard piston, less running clearance will be available between the brake pads and the rotor. Because of this lower running clearance, the brake piston may push the brake pad toward the rotor and apply an off-brake drag force. The off-brake drag force results in a reduced brake pad life due to the increased rotor contact and an increase in fuel consumption by a vehicle due to having to overcome the off-brake drag force.

Additionally, for vehicles having sport-tuned suspensions or other high performance and/or luxury vehicles, consumers desire a tight pedal feel with increased stiffness. This tactile feeling has generally only been achievable through completely metallic brake pistons, polymeric brake pistons with increased material thickness, or changing the material of the brake pad.

Exemplary plastic brake pistons are discussed in U.S. Pat. Nos. 4,449,447; 8,348,030, 6,085,636; and 5,845,747, which are expressly incorporated herein by reference for all purposes. Notwithstanding the above, there appears an absence in teaching of how to reinforce a polymer based brake piston with a metallic insert while preventing heat transfer from the friction material to the brake fluid.

Thus, what is needed is a brake piston able to provide for improved heat dissipation, able to prevent overheating of brake fluid, while also having decreased deflection during application of a braking force. What is needed is a brake piston capable of providing a tight pedal feel with increased stiffness without having to be comprised completely of metal, without having to increase the thickness of a polymeric piston, and allowing the use of standard brake pad material. What is needed is a brake piston having an increased stiffness to increase running clearance and lower off-brake drag, improving fuel efficiency and brake pad life.

SUMMARY

The present disclosure relates to a brake piston comprising: a) an open end; b) a closed end; c) a piston cylindrical wall comprising a polymeric material which extends from the closed end to the open end; d) a core member comprising a metallic material located within the cylindrical wall which extends between the closed end and the open end without extending completely to the open end; and wherein the core member structurally reinforces the brake piston.

The present disclosure relates to a brake piston comprising: a) an open end; b) a closed end; c) a piston cylindrical wall comprising a phenolic resin which extends from the closed end to the open end; d) a core member comprising a metallic material located within the cylindrical wall, which includes: (i) a closed end support portion which is integral with or adjacent to the closed end; and (ii) a core cylindrical wall which extends from the closed end support portion toward the open end; wherein the core member is free of contact with the open end; and wherein the core member structurally reinforces the brake piston.

The present disclosure relates to a brake assembly comprising: a) a brake pad; b) a brake fluid within a caliper body; c) a brake piston in contact with both the brake pad and the brake fluid; the brake piston including: (i) an open end adapted for transferring a brake apply force to the brake pad; (ii) a closed end adapted for being in contact and receiving the brake apply force from the brake fluid; (iii) a piston cylindrical wall comprising a phenolic resin which extends from the closed end to the open end; and (iv) a core member comprising a metallic material located within the cylindrical wall which extends between the closed end and the open end without extending completely to the open end; wherein the core member structurally reinforces the brake piston when transferring and receiving the brake apply force; and wherein the brake assembly is a disc brake assembly.

In some embodiments, the polymeric material may include a phenolic resin. In some embodiments, the metallic material may be a steel, an iron, an aluminum, or any combination thereof. In some embodiments, the closed end support portion may be integral with or adjacent to the closed end. In some embodiments, the closed end support portion may have a generally disc-like shape. In some embodiments, the core cylindrical wall may extend from the closed end support portion toward the open end. In some embodiments, the piston cylindrical wall may include an exterior wall which connects the open end to the closed end; and an interior wall which forms a hollow bore which extends from the open end toward the closed end. In some embodiments, the core cylindrical wall is located between the exterior wall and the interior wall such that the core cylindrical wall at least partially surrounds the hollow bore. In some embodiments, the core cylindrical wall has a length such that it is distanced from the open end by at least 8 mm so that the core member is free of contact with the open end. In some embodiments, the core member may be solid, include one or more openings, or both. In some embodiments, the core member may have a mesh-like structure. In some embodiments, the closed end support portion of the core may have a thickness from about 1 mm to about 20 mm. In some embodiments, the cylindrical wall of the core member may have a thickness from about 1 mm to about 6 mm. In some embodiments the brake piston may be part of a disc brake assembly.

The present disclosure provides a brake piston made of a phenolic resin which may be able to provide the benefits of improved heat dissipation and prevention of overheating of brake fluid, while also having a core member which may result in decreased deflection during application of a braking force. The brake piston being formed of a polymer material may provide the benefits of heat dissipation. The core member residing within the brake piston may be sufficiently distanced from the open end so as to not substantially contribute to any heat conducted from the brake pad to the brake fluid. Due to the decreased deflection, the brake piston may provide a vehicle driver with a tight pedal feel. Decreased deflection of the brake piston may result in a lower off-brake drag force, which may further result in increased fuel efficiency and/or brake pad life.

BRIEF DESCRIPTION OF DRAWINGS

FIG. 5b is a cross-section view of the core member of FIG. 5a.

FIG. 6b is a side plan view of the core member of FIG. 6a.

FIG. 7b is a side plan view of the core member of FIG. 7a.

DETAILED DESCRIPTION

Figure 1:
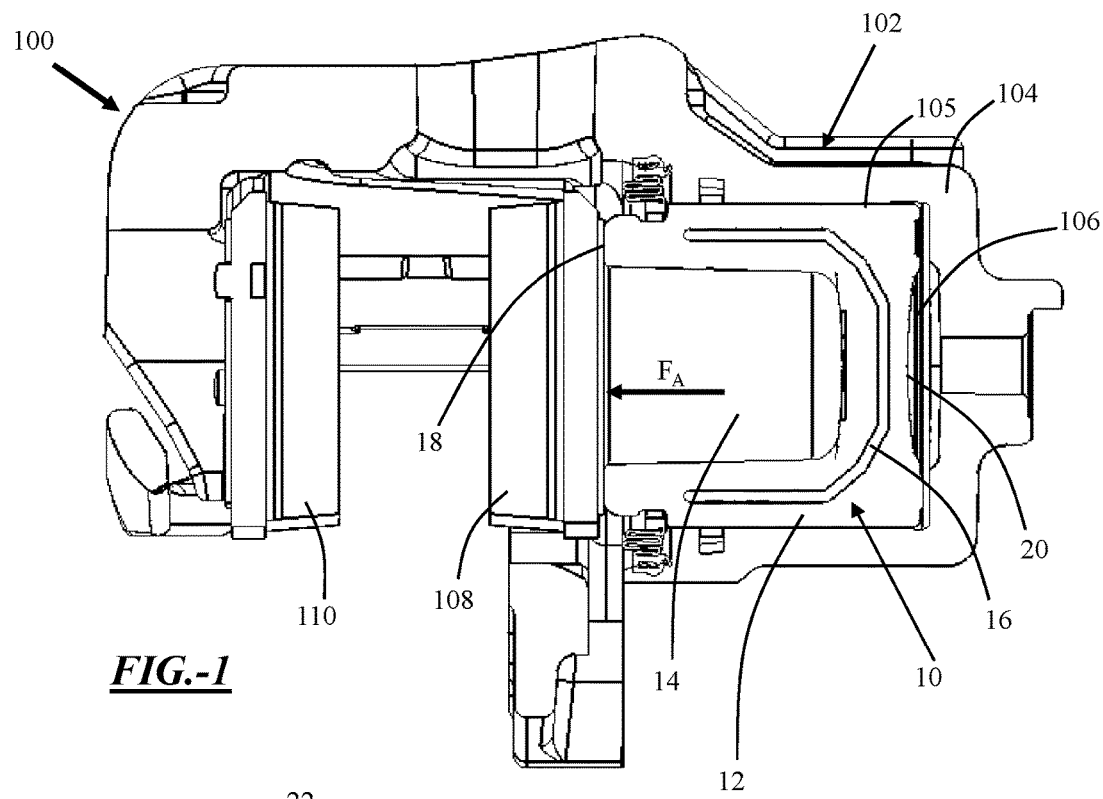
FIG. 1 illustrates a cross-section of a brake assembly including a brake piston according to the teachings.

The present teachings meet one or more of the above needs by the improved devices and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present disclosure generally provides a brake assembly and brake piston for use with vehicles. The brake assembly and brake piston may be used with almost any vehicle. A vehicle may include a car, truck, bus, train, airplane, motorcycle, or the like. Alternatively, the brake assembly and or the brake piston may be integrated into components used for manufacturing or other equipment requiring a brake. Components may include a lathe, winder for paper products or cloth, amusement park rides, turbines, or the like. However, the present disclosure may be found particularly suitable for use with passenger vehicles. Passenger vehicles may include a car, truck, sports utility vehicle, or the like. A brake assembly may be understood as a disc brake, drum brake, hydraulic brake, electronic brake, electromechanical brake, the like, or any combination thereof. The present disclosure may find particular use in a disc brake assembly.

Generally, a brake assembly includes a rotor and a caliper body. The caliper body includes an inboard friction material and an outboard friction material on opposing sides of the rotor. The friction material may be part of a brake pad. The caliper body may include at least one piston bore in which at least one brake piston may be housed. The piston bore may include a fluid inlet, a closed wall, a front opening, and a cylindrical side wall which includes an annular groove (i.e., seal groove) located near the front opening. A seal may be located about the annular groove to form an interference fit with the brake piston. The fluid inlet may be in the closed wall and may be in fluid communication with the master cylinder. The fluid inlet may allow for brake fluid to enter the piston bore so that the brake piston is moved towards the front opening. The piston may be moved by the brake fluid or may be mechanically moved, such as by an actuator or driver (e.g., a rotary to linear actuator). The front opening may allow the brake fluid to move the piston towards the front opening and into contact with the friction material. The friction material may then be moved into contact with the rotor so that the braking force is created.

The present teachings relate to a brake piston. The brake piston may be useful in receiving and transferring a brake apply force, be in contact with brake fluid, move axially upon receiving a brake apply force from brake fluid, be in contact with a brake pad, push a brake pad axially to transfer a brake apply force, or any combination thereof. The brake piston may be any size and/or shape suitable for receiving and transferring a brake apply force, be in contact with brake fluid, move axially upon receiving a brake apply force from brake fluid, be in contact with a brake pad, push a brake pad axially to transfer a brake apply force, or any combination thereof. The brake piston may have any size and/or shape which is generally complementary to a piston bore of a brake caliper to allow axial movement of the brake piston within the piston bore. The shape of the brake piston may generally be cubical, spherical, cylindrical, coned, the like, or any combination thereof. For example, the brake piston may generally be cylindrical. The brake piston may include a longitudinal axis. The longitudinal axis may extend from a center of a closed end to a center of an open end.

The brake piston has an overall length. The length may be defined as the distance from a closed end to an open end along a longitudinal axis. The length of the brake piston may be any length suitable so that during transmission of the brake apply force, the brake piston moves into contact with a friction material and the friction material applies the brake apply force to a rotor. The length of the brake piston may vary from piston to piston. For example, a truck may have a longer piston than a compact car. The length of the piston cylindrical wall may be from about 15 mm or greater, about 25 mm or greater, or even about 35 mm or greater. The length of the piston cylindrical wall may be from about 70 mm or less, about 60 mm or less, or even about 50 mm or less. The piston may have an outer diameter. The outer diameter of the piston may vary from piston to piston. For example, a truck may have a piston with a larger diameter than that of a compact car. The outer diameter of the piston may be about 8 mm or more, about 15 mm or more, about 20 mm or more, or even about 30 mm or more. The outer diameter may be about 80 mm or less, about 70 mm or less, or even about 65 mm or less.

The brake piston includes a piston cylindrical wall. The piston cylindrical wall may be any size and/or shape capable of sliding inside a piston bore. The piston cylindrical wall may have a size and/or shape which generally complementary to a piston bore of the caliper. The shape of the piston cylindrical wall may be cubical, spherical, cylindrical, coned, the like, or any combination thereof. For example, the piston cylindrical wall may be generally cylindrical. The piston cylindrical wall may extend from a closed end of the brake piston to an open end of the brake piston. The piston cylindrical wall may be integral with the closed end or may be connected to a closed end of the brake piston. The piston cylindrical wall includes a length. The length may be the distance from the closed end to the open end. The length may be any distance which may allow the closed end to contact a brake fluid, receive a pressure or force from the brake fluid, the open end to contact a friction material, the open end to push and move the friction material, or any combination thereof. The length of the piston cylindrical wall may be equal to or less than the length of the brake piston. The length of the piston cylindrical wall may be about equal to the length of the piston cylinder less a thickness of a closed end. The piston cylindrical wall may include an exterior diameter. The exterior diameter may be a straight line distance from one side of an exterior wall of the piston cylindrical wall to an opposing side of the exterior wall through the center of the piston cylindrical wall. The exterior diameter may be any size such that the piston cylindrical wall may be able to fit within a piston bore. The exterior diameter may be the same as the outer diameter of the brake piston. The exterior diameter may change along the length of the piston cylindrical wall. For example, a groove in the piston cylindrical wall may have a smaller or larger exterior diameter than another portion of the piston cylindrical wall, the open end may have a smaller or larger exterior diameter than the closed end, or both. The piston cylindrical wall may include an annular groove, such as that described in U.S. Pat. No. 4,449,447 and U.S. Patent Publication No. 2016/0146345, incorporated herein by reference in their entirety for all purposes. The annular groove may be useful for fitting with a piston boot. The annular groove may be formed in an exterior wall of the piston cylindrical wall.

The piston cylindrical wall may include an exterior wall and an interior wall. The exterior wall may connect the closed end to the open end. The exterior wall may run an entire length of the piston cylindrical wall or may only be along a portion of a length of the piston cylindrical wall. The interior wall may form a wall of a hollow bore, may connect the open end to the closed end, may connect the open end to a bore end wall, or any combination thereof. The interior wall may run along an entire length of the piston cylindrical wall or may only be along a portion of a length of the piston cylindrical wall. The distance between the exterior wall and the interior wall may be a wall thickness of the piston cylindrical wall. The wall thickness may be any size which resists failure of any part of the piston cylindrical wall. The wall thickness may be thick enough that axial forces and the radial forces applied during a brake apply do not damage the piston cylindrical wall. The wall thickness may be thick enough that the piston cylindrical wall withstands radial forces during a brake apply and so that the brake piston may apply force to and axially move a friction material (i.e., brake pad). The wall thickness may be about 0.5 mm or greater, about 5 mm or greater, or even about 10 mm or greater. The wall thickness may be about 20 mm or less, about 15 mm or less, or even about 13 mm or less.

The brake piston includes a closed end. The closed end functions to receive a hydraulic force from the brake fluid so that the piston is axially moved. The closed end may be in contact with brake fluid, prevent brake fluid from entering the brake piston, may receive a brake apply pressure from the brake fluid, or any combination thereof. The closed end may have a cross-section having a similar or same shape and/or size as a cross-section of the piston cylindrical wall. The closed end may be integral with the piston cylindrical wall or attached to the piston cylindrical wall. The closed end may be integral with a core member or separate from a core member. The closed end may include two opposing surfaces. The two opposing surfaces may include an exterior surface and an interior surface. The exterior surface may be the surface facing away from the open end and/or exposed and in contact with the brake fluid. The interior surface may face toward the hollow bore, be a wall of the hollow bore, face toward a friction material, or any combination thereof. One or both of the two opposing surfaces may be at least partially flat. The exterior surface may include a portion which may be generally parallel to at least a portion of the interior surface. One or both of the two opposing surfaces may be at least partially curved. The exterior surface may include a generally dome shaped surface. The generally dome shaped surface may be concave toward the open end. The generally dome shaped surface may have a smaller diameter than an overall diameter of the exterior surface. The interior surface may include a generally concave portion toward the exterior surface.

The closed end may have a thickness. The thickness of the closed end may be a distance between the interior surface and the exterior surface. The thickness may be smaller than, equal to, or larger than a thickness of the piston cylindrical wall. The thickness may be greater than or equal to a thickness of a core member. The thickness may be sufficiently large such that a portion of the core member may reside between the interior surface and the exterior surface or the core member may be able to form the closed end. The thickness of the closed end may be about 1 mm or greater, about 5 mm or greater, about 10 mm or greater, or even about 15 mm or greater. The thickness of the closed end may be about 40 mm or less, about 30 mm or less, or even about 20 mm or less. The closed end may include a diameter. The diameter may be equal to a diameter of the piston cylindrical wall, the brake piston, or both. The interior surface of the closed end may form a surface of a hollow bore.

The brake piston may include a hollow bore. The hollow bore may function to provide a light weight brake piston so that the brake fluid is able to apply a sufficient brake apply force to axially move the brake piston to push the friction material, provide heat dissipation from heat generated in the brake piston during brake apply, or both. The hollow bore may be cubical, spherical, cylindrical, coned, prism-shaped (i.e., hexagonal prism, octagonal prism) the like, or any combination thereof. For example, the hollow bore may generally be cylindrical. The hollow bore may be formed by an interior wall of a piston cylindrical wall, an interior surface of a closed end, or both. The hollow bore may have a hollow bore end surface. The hollow bore end surface may be formed by a closed end, a core member, be integral with the piston cylindrical wall, be integral with a core member, or any combination thereof. The hollow bore may include an opening in an open end of the brake piston. The hollow bore may extend from the opening in the open end toward the closed end.

The hollow bore may have a length. The length of the hollow bore may be the distance from a center of the open end to the hollow bore end surface. The hollow bore may have a length about equal to or less than a length of the piston cylindrical wall. The hollow bore may have a length from about 15 mm or greater, about 25 mm or greater, or even about 30 mm or greater. The hollow bore may have a length from about 50 mm or less, about 40 mm or less, or even about 35 mm or less. The hollow bore may have a length equal to about 20% or more of the piston length, about 30% or more of the piston length, or even about 40% or more of the piston length. The hollow bore may have a length equal to about 100% or less of the piston length, about 80% or less of the piston length, or even about 70% or less of the piston length. The hollow bore may have a diameter. The diameter is less than the exterior diameter of the brake piston and piston cylindrical wall. The diameter of the hollow bore may be equal to the diameter of the interior wall of the piston cylindrical wall. The diameter may be equal to the exterior diameter of the piston cylindrical wall less two times the thickness of the piston cylindrical wall (i.e., hollow bore diameter=piston cylindrical wall diameter−2×piston cylindrical wall thickness)

The brake piston includes an open end. The open end may provide an abutment surface for engaging a friction material, transferring a brake apply pressure to a friction material, or both. The open end of the brake may have any size and/or shape suitable for providing an abutment surface for engaging the friction material, transferring a brake apply pressure, or both. The open end may have a cross-section having a similar or same shape and/or size as a cross-section of the piston cylindrical wall. The open end may have an opening. The opening may be formed by the interior wall of the piston cylindrical wall. The opening may form a portion of the piston hollow bore. The open end may have a total surface area. The total surface area may be the surface which is able to contact or is in contact with a friction material. The surface area may be defined as the cross-sectional area of the exterior of the piston cylindrical wall at the open end less the cross-sectional area of the piston hollow bore at the open end. A core member within the piston cylindrical wall may be free of contact with the open end and/or distanced from the open end.

The brake piston may be comprised of one or more wall materials. The one or more wall materials may function to prevent permeation of brake fluid into the brake piston, may prevent heat transfer of heat to brake fluid, or both. The one or more wall materials may be part of the piston cylindrical wall, closed end, open end, or any combination thereof. The one or more wall materials may be any material which may prevent permeation of brake fluid and/or prevent heat transfer of brake fluid. The one or more wall materials may include a metal, a polymeric material, or both. Metal may include cast iron, steel, stainless steel, titanium, aluminum, carbon steel, the like, or any combination thereof. Polymeric material may be any material which may be molded. For example, the polymeric material may be injection molded. Polymeric material may include a glass fiber mold, a thermoset polymer, a thermoplastic polymer, or a combination thereof. The polymeric material may be reinforced with fibers. The fibers may include nylon. The polymeric material may include phenolic resin and/or acrylonitrile butadiene styrene. An exemplary wall material may be Durez® 29502 Phenolic.

The one or more wall materials may have a post-baked Rockwell Hardness of about 50 E Scale or more, preferably of about 60 E Scale or more, or more preferably of about 70 E Scale or more measured using ASTM D785 (i.e. between about 104.5 and about 105.8 E Scale). The one or more wall materials may have a post-baked Rockwell Hardness of about 200 E Scale or less, preferably of about 150 E Scale or less, or more preferably of about 125 E Scale or less measured using ASTM D785. The one or more wall materials may have a post-baked Compressive Strength of about 150 MPa or more, preferably about 200 MPa or more, or more preferably about 250 MPa or more measured using ASTM D695 (i.e. between about 274 to about 283 MPa). The one or more wall materials may have a post-baked Compressive Strength of about 500 MPa or less, preferably about 400 MPa or less, or more preferably about 300 MPa or less measured using ASTM D695. The one or more wall materials may have a post-baked Tensile Strength of about 150 MPa or less, preferably about 125 MPa or less, or more preferably about 100 MPa or less measured using ASTM D695 (i.e. between about 60.7 to about 71.0 MPa). The one or more wall materials may have a post-baked Tensile Strength of about 30 MPa or more, preferably about 40 MPa or more, or more preferably about 50 MPa or more measured using ASTM D695. The one or more wall materials may have a post-baked Flexural Strength of about 50 MPa or more, preferably of about 70 MPa or more, or more preferably of about 85 MPa or more measured using ASTM D790 (i.e. between about 101.1 to about 107.5 MPa). The one or more wall materials may have a post-baked Flexural Strength of about 200 MPa or less, preferably of about 150 MPa or less, or more preferably of about 125 MPa or less measured using ASTM D790. The one or more wall materials may have a post-baked Flexural Modulus of about 10

GPa or more, preferably of about 20 GPa or more, or more preferably of about 25 GPa or more measured using ASTM D790 (i.e. between about 23.6 to about 24.4 GPa). The one or more wall materials may have a post-baked Flexural Modulus of about 50 GPa or less, preferably of about 40 GPa or less, or more preferably of about 30 GPa or less measured using ASTM D790. The one or more wall materials may have a Deflection Temperature of about 200° C. or greater, preferably of about 225° C. or greater, more preferably of about 250° C. or greater measured using ASTM D648 (i.e. about 275° C. or greater). The one or more wall materials may have properties similar to or identical as the properties exhibited by suitable materials disclosed in U.S. Pat. No. 8,348,030, incorporated herein by reference for all purposes.

The brake piston includes one or more core members. The brake piston may include a plurality of core members. The one or more core members may function to provide structural reinforcement to the brake piston, prevent or limit deflection of the brake piston from axial and/or radial forces, or both. The one or more core members may limit deflection of the brake piston by providing improved (i.e., reduced) axial reduction and/or improved (i.e., reduced) radial reduction. The deflection may include an axial reduction of the brake piston from about 0.02 mm to about 0.05 mm and/or a radial reduction of the brake piston from about 0.002 mm to about 0.008 mm when receiving from about 0 MPa to about 15 MPa of pressure from the brake fluid. The core member may have a shape substantially similar to all or a portion of the piston cylindrical wall, the closed end of the brake piston, the piston hollow bore, or any combination thereof. The core member may be located within the piston cylindrical wall, at the closed end of the brake piston, encircle around all or at least a portion of the hollow bore, or any combination thereof. A core member may at least partially encircle the hollow bore by about 90° or more, about 135° or more, or even about 180° or more. A core member may encircle the hollow bore by about 360° or less, about 315° or less, or even about 270° or less. The core member may extend between the closed end and the open end. A surface of the core member located nearest the open end may be referred to as an end surface. The core member may not extend completely to the open end. The core member may be made of a more conductive material than the piston cylindrical wall. The core member may not extend completely to the open end so that at least some of the heat (i.e., heat generated between a brake pad and brake rotor transferred to the brake piston) is able to dissipate before being conducted to the core member. By dissipating at least some of the heat before reaching the core member from the open end, at least some of the heat is prevented from being conducted to the brake fluid and overheating of the brake fluid may be prevented. Piston material may be located between the core member and the brake pad so that the piston material prevents heat from being transferred from the brake pad to the core material. A portion of the core member located nearest the closed end may be a closed end support portion.

The core member may include one or more closed end support portions. The one or more closed end supports may function to provide structural support to the closed end of the brake piston, between an interior surface and exterior surface of the closed end, between the hollow bore and the exterior surface of the closed end, or any combination thereof. The closed end support portion may have any size and/or shape to provide structural support to the closed end of the brake piston. The closed end support portion may have a shape substantially similar to that of the closed end. The closed end support portion may be generally cubical, spherical, cylindrical, coned, the like, or any combination thereof. The closed end support portion may be cylindrical or disc shaped. The closed end support portion may include two opposing surfaces. The two opposing surfaces may include an inwardly facing surface and an outwardly facing surface. The inwardly facing surface may face toward the hollow bore, face toward the open end, may form all or at least a portion of the bore end wall, or any combination thereof. The outwardly facing surface may be opposing the inwardly facing surface, face toward the exterior surface of the closed end, may form all or at least a portion of the exterior surface of the closed end, or any combination thereof. One or both of the two opposing surfaces may be at least partially flat. The outwardly facing surface may include a portion which may be generally parallel to at least a portion of the inwardly facing surface. One or both of the two opposing surfaces may be at least partially curved. The outwardly facing surface may include a generally dome shaped surface. The generally dome shaped surface may be concave toward the open end. The generally dome shaped surface may have a smaller diameter than an overall diameter of the outwardly facing surface. The generally dome shaped surface may be generally concentric with a center of the closed end. The inwardly facing surface may include a generally concave portion toward the exterior surface. The two opposing surfaces of the closed end support portion may be complementary and/or substantially similar in shape to the two opposing surfaces of the closed end of the piston cylindrical wall. For example, the inwardly facing surface may be generally flat while the outwardly facing surface may be generally dome shaped.

The closed end support portion may have a thickness. The thickness of the closed end support portion may be the distance between the inwardly facing surface and the outwardly facing surface. The thickness may be smaller than or equal to a thickness of the closed end of the brake piston. The thickness may be smaller than, equal to, or greater than a core cylindrical wall. The thickness may be sufficiently small that the closed end support portion may be able to reside within the closed end. The thickness of the closed end support portion may be about 0.5 mm or greater, about 1 mm or greater, about 5 mm or greater, or even about 10 mm or greater. The thickness of the closed end support portion may be about 40 mm or less, about 30 mm or less, or even about 20 mm or less. The thickness of the closed end support portion may be about 5% or greater than the thickness of the closed end, about 10% or greater than the thickness of the closed end, or even about 25% or greater than the thickness of the closed end. The thickness of the closed end support portion may be about 100% or less than then thickness of the closed end, about 95% or less than the thickness of the closed end, or even about 80% or less than the thickness of the closed end. The closed end support portion may have an outer width. The outer width may be defined as the longest linear distance from an exterior surface to an opposing exterior surface across a cross-section of the closed end support portion. For example, the outer width may be the outer diameter if the closed-end support portion has a generally disc-like shape. The outer width may be sufficiently small that the closed end support portion is able to reside within the closed end, the piston cylindrical wall, or both. The outer width may be sufficiently large that the closed end support portion may be at least a portion of the closed end. The outer width of the closed end support portion may be less than, about equal to, or greater than an outer width of a core cylindrical wall, an outer width of a closed end, a diameter of a hollow bore, or any combination thereof. The outer width of the closed end support portion may be about 5 mm or greater, about 10 mm or greater, or even about 15 mm or greater. The outer width of the closed end support portion may be about 75 mm or less, about 70 mm or less, or even about 65 mm or less.

The core member may include a core cylindrical wall. The core cylindrical wall may provide structural reinforcement to the closed end of the brake piston, the piston cylindrical wall, the hollow bore, or any combination thereof. The core cylindrical wall may have a similar shape to the hollow bore, the piston cylindrical wall, or both. The core cylindrical wall may be cubical, spherical, cylindrical, coned, the like, or any combination thereof. For example, the core cylindrical wall may be cylindrical. The core cylindrical wall may be separate from, adjacent to, connected to, or integral with the closed end support portion. The core cylindrical wall may extend from the closed end support portion. The core cylindrical wall may extend toward the open end. The core cylindrical wall may be located at least partially about the diameter of the hollow bore. The core cylindrical wall may be generally concentric with the piston cylindrical wall, the hollow bore, or both. The core cylindrical wall may be at least partially located between the interior wall and exterior wall of the piston cylindrical wall. The core cylindrical wall may include an end surface. The end surface may be an opposing end of the core member as the closed end support portion. The end surface may be located generally parallel to the open end of the brake piston. The end surface may be distanced from the open end such that it is not in contact with the open end.

The core cylindrical wall may have a thickness. The thickness of the core cylindrical wall portion may be the distance between an interior surface and an exterior surface of the core cylindrical wall. The thickness may be smaller than or equal to a thickness of the piston cylindrical wall. The thickness may be sufficiently small that the core cylindrical wall may be able to reside within the piston cylindrical wall. The thickness may be substantially uniform or non-uniform. For example, the thickness may taper toward the open end, or may taper toward the closed end. The thickness of the core cylindrical wall may be about 0.25 mm or greater, about 0.5 mm or greater, about 1 mm or greater, or even about 2 mm or greater. The thickness of the core cylindrical wall may be about 15 mm or less, about 10 mm or less, or even about 6 mm or less.

The core cylindrical wall may have an outer width and an inner width. The outer width may be defined as the longest linear distance from an exterior surface to an opposing exterior surface across a cross-section of the core cylindrical wall. For example, the outer width may be the outer diameter if the core cylindrical wall has a generally cylindrical shape. The outer width may be sufficiently small that the core cylindrical wall is able to reside within the piston cylindrical wall. The outer width of the core cylindrical wall may be smaller than the outer width of the piston cylindrical wall so the core is able to support the piston cylindrical wall from within. An exterior surface of the core cylindrical wall may be distanced from an opposing and/or adjacent exterior surface of the piston cylindrical wall. The exterior surface of the core cylindrical wall may be distanced from the piston cylindrical wall by about 0.25 mm or greater, about 1 mm or greater, or even about 2 mm or greater. The exterior surface of the core cylindrical wall may be distanced from the piston cylindrical wall by about 19.5 mm or less, about 19 mm or less, or even about 18 mm or less. The outer width may be less than, equal to, or greater than the outer width of the closed end support portion. The outer width may be equal to the width of the closed end support portion so that the exterior of the closed end support portion is continuous with the exterior surface of the core cylindrical wall. The outer width may be less than a width of the closed end support portion such that a flange is formed. The flange may be the inwardly facing surface of the closed end support portion which is not attached or integral with the core cylindrical wall nor located within the interior diameter of the core cylindrical wall. The outer width of the core cylindrical wall may be about 5 mm or greater, about 15 mm or greater, or even about 25 mm or greater. The outer width of the core cylindrical wall may be about 78 mm or less, about 68 mm or less, or even about 63 mm or less. The inner width may be defined as the longest distance from an interior surface to an opposing interior surface across a cross-section of the core cylindrical wall. For example, the inner width may be the inner diameter if the core cylindrical wall has a generally cylindrical shape. The inner width may be sufficiently large that the core cylindrical wall is able to be located about at least a portion of the hollow bore. The inner width of the core cylindrical wall may be equal to the outer width of the core cylindrical wall less twice the thickness of the core cylindrical wall.

The core cylindrical wall may include a length. The length of the core cylindrical wall may be the distance from where the core cylindrical wall abuts or extends from the inwardly facing surface of the closed end support portion to an opposing end surface. The length may be sufficiently long that the core cylindrical wall reinforces the piston cylindrical wall, is located at least about a portion of the hollow bore, is distanced from the open end, or any combination thereof. The length may be sufficiently small that the core cylindrical wall does not extend fully into the open end of the brake piston, does not extend past the annular groove toward the open end, the end surface is located between the closed end and the annular groove, or any combination thereof. The length of the core cylindrical wall may allow the end surface to be distanced from the open end by about 8 mm or greater, about 10 mm or greater, or even about 15 mm or greater. The length of the core cylindrical wall may allow the end surface to be distanced from the open end by about 50 mm or less, about 40 mm or less, or even about 30 mm or less. The distance between the end surface and the open end may be about 10% or greater of the length of the piston cylindrical wall, about 15% or greater of the length of the piston cylindrical wall, or even about 20% or greater of the length of the piston cylindrical wall. The distance between the end surface and the open end may be about 75% or less of the length of the piston cylindrical wall, about 50% or less of the length of the piston cylindrical wall, or even about 40% or less of the length of the piston cylindrical wall. The length of the core cylindrical wall may be less than a length of the piston cylindrical wall. The length of the core cylindrical wall may be about 5 mm or greater, about 10 mm or greater, or even about 15 mm or greater. The length of the core cylindrical wall may be about 62 mm or less, about 55 mm or less, or even about 50 mm or less. The length of the core cylindrical wall may be about 7% or greater than the length of piston cylindrical wall, about 10% or greater than the length of the cylindrical wall, or even about 15% or greater than the length of the cylindrical wall. The length of the core cylindrical wall may be about 90% or less than the length of piston cylindrical wall, about 85% or less than the length of the cylindrical wall, or even about 80% or less than the length of the cylindrical wall.

The core member may include continuous or discontinuous surfaces. A discontinuous core material may function to reinforce the brake piston while adding less weight than a continuous core material, provide less core material able to conduct heat, or both. Continuous may be understood as having a continuous exterior surface, interior surface, or both. Discontinuous may include having one or more surfaces with one or more openings. Discontinuous may mean the core member has a surface with a plurality of openings, a mesh-like structure, a plurality of cut-outs, or any combination thereof. Mesh-like structure may include a lattice structure, a perforated structure, a porous structure, the like, or a combination thereof. A mesh-like structure may be formed by a plurality of connected segments (i.e., strands), one or more perforated sheets, the like, or any combination thereof. The mesh-like structure may have a repetitive pattern or no pattern. For example, connected segments may form a repetitive crisscross pattern. The connected segments may be woven together, welded together, integral with one another, or otherwise connected to form the mesh-like structure. For example, the segments may connect to other segments at respective ends of each of the segments and form one or more openings (i.e., spaces and/or voids) between the segments, the connected ends of the segments, or both. The individual segments may have a cross-sectional shape which is generally rectangular, circular, triangular, elliptical, trapezoidal, prism-shaped, the like, or any combination thereof. The individual segments may each have a width from about 0.1 mm or more, about 0.25 mm or more, or even about 1 mm or more. The individual segments may each have a width from about 10 mm or less, about 7 mm or less, or even about 5 mm or less. A plurality of openings of the core member may be formed by spaces or voids between connected segments, perforations and/or pores of a sheet, and/or the like. The one or more wall materials may extend through the spaces or voids so that a portion of each segment is substantially surrounded by the one or more wall materials. The plurality of openings may have a cross-sectional shape which is generally rectangular, circular, triangular, elliptical, trapezoidal, the like, or any combination thereof. The plurality of openings may have a repetitive pattern along at least a portion of the core member, may be located randomly along at least a portion of the core member, or both. Each individual opening through the surface of the core member may have a cross-sectional area of about 10 mm$^2$ or more, about 20 mm$^2$ or more, or even about 30 mm$^2$ or more. Each individual opening through the surface of the core member may have a cross-sectional area of about 150 mm$^2$ or less, about 100 mm$^2$ or less, or even about 80 mm$^2$ or less. The core member may include one or more reinforcing structures. Reinforcing structures may include one or more ribs, one or more protrusions, one or more indentations, one or more extensions, one or more tabs, one or more notches, one or more varying thicknesses, the like, or any combination thereof. The reinforcing structures may be located on all or a portion of a closed end support portion, core cylindrical wall portion, end surface, or any combination thereof. The reinforcing structures may extend outward from the core member toward the exterior of the piston and/or inward toward the hollow bore. The reinforcing structures may not extend beyond the piston cylindrical wall.

The core member may be comprised of one or more core materials. The one or more core materials may be suitable for reinforcing one or more wall materials, being located within one or more wall materials, and/or being attached to one or more wall materials. The one or more core materials may differ from the one or more wall materials. For example, the one or more core materials may be metallic and the one or more wall materials may be a polymeric material. The one or more core materials may include any combination of the one or more wall materials discussed hereinbefore. The one or more core materials may include woven or nonwoven materials. The one or more core materials may be substantially rigid, flexible, or a combination of both before being located within the piston cylindrical wall.

The one or more core materials may have a Rockwell Hardness sufficient to provide reinforcement to the one or more wall materials, to reduce deformation of the brake piston as compared to a brake piston made of only one or more wall materials, or both. The one or more core materials may have a Rockwell Hardness about equal to or greater than the post-baked Rockwell Hardness of the one or more wall materials. The one or more core materials may have a Rockwell Hardness of about 60 B Scale or more, about 70 B Scale or more, or even about 80 B Scale or more measured using ATSM D785. The one or more core materials may have a Rockwell Hardness of about 120 B Scale or less, about 110 B scale or less, or even about 100 B scale or less measured using ATSM D785. The one or more core materials may have a Compressive Strength sufficient to provide structural reinforcement to the one or more wall materials. The one or more core materials may have a Compressive Strength which maintains or increases the overall Compressive Strength of the brake piston as compared to a brake piston made solely from one or more wall materials. The one or more core materials may have a Compressive Strength of about 200 MPa or greater, about 250 MPa or greater, or even about 300 MPa or greater. The one or more core materials may have a Compressive Strength of about 1,300 MPa or less, about 1,200 MPa or less, or even about 1,000 MPa or less. The one or more core materials may have a Tensile Strength sufficient to provide structural reinforcement to the one or more wall materials. The one or more core materials may have a Tensile Strength which increases the overall Tensile Strength of the brake piston as compared to a brake piston made solely from one or more wall materials. The one or more core materials may have a Tensile Strength of about 300 MPa or greater, about 400 MPa or greater, or even about 500 MPa or greater. The one or more core materials may have a Tensile Strength of about 2,000 MPa or less, about 1,900 MPa or less, or even about 1,800 MPa or less.

The disclosure may further relate to a method of manufacturing a brake piston according to the teachings herein. The method may include forming a brake piston, forming a core member, locating the core member within the brake piston, inserting the brake piston into a caliper body, or any combination thereof.

The method may include forming a core member from one or more core materials. Forming the core member may include deforming one or more core materials to form a core member having a closed end support portion, core cylindrical wall, or both. Deforming one or more core materials may include compressive forming, tensile forming, bending, shearing, or any combination thereof. Forming the core member may include bonding one or more core materials together. Bonding one or more core materials may include welding. Forming the core member may include molding or casting. Molding or casting may include any type of expendable mold casting and/or non-expendable mold casting.

The method may include forming a brake piston body from one or more wall materials. Forming the brake piston body may include molding the brake piston body to have a closed end, a piston cylindrical wall, an open end, or any combination thereof. Forming the brake piston may include any of the processes described hereinbefore suitable for forming the core member. Forming the brake piston may include molding. Molding may include injection molding, blow molding, compression molding, film insert molding, gas assist molding, structural foam molding, thermoforming, the like, or any combination thereof.

The method may include locating the core member within the brake piston body to form the brake piston. Locating the core member within the brake piston body may include forming the brake piston about the core member, forming the core member within the brake piston, inserting the core member into the brake piston body, or both. Locating the core member within the brake piston body may include simultaneously or non-simultaneously forming the brake piston and the core member such that the core member is formed within the brake piston. Locating the core member within the brake piston body may include filling one or more spaces or voids of the core member with one or more wall materials, substantially surrounding connected segments of the core member with one or more wall materials, or both.

The method may include inserting the brake piston into a caliper body. Inserting the brake piston into the caliper body may include inserting the brake piston into a piston bore. Inserting the brake piston may include placing brake fluid into contact with the closed end of the brake piston. Inserting the brake piston may include affixing a frictional material (i.e., brake pad) to the caliper body. Inserting the brake piston may include placing the open end of the brake piston into contact with a friction material.

Illustrative Embodiments

The following descriptions of the Figures are provided to illustrate the teachings herein, but are not intended to limit the scope thereof.

FIG. 1 illustrates a brake assembly 100. The brake assembly 100 is a disc brake assembly. The brake assembly 100 includes a caliper body 104. The caliper body 104 includes a piston bore 105 adjacent to an inner brake pad 108. A brake piston 10 and brake fluid 106 are located within the piston bore 105. The brake piston 10 includes an open end 18 opposing a closed end 20. The closed end 20 is adapted for receiving a brake apply force $F_A$ from the brake fluid 106. The open end 18 is adapted for transferring the brake apply force $F_A$ to the inner brake pad 108. The open end 18 is in direct contact with the inner brake pad 108. The inner brake pad 108 may cooperate with an outer brake pad 110 to apply the brake apply force $F_A$ to a brake rotor (not shown) located between the inner and outer brake pads 108, 110. The brake piston 10 includes a core member 16. The core member 16 is located within a piston cylindrical wall 12. The core member 16 structurally reinforces the brake piston 10 during receipt and transfer of the brake apply force $F_A$.

Figure 2:
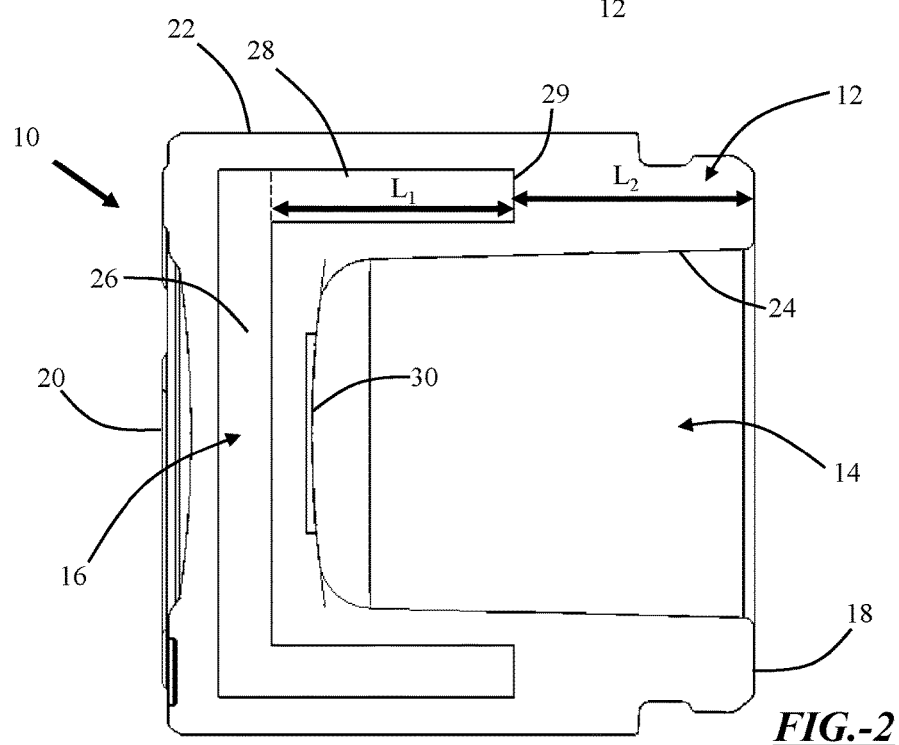
FIG. 2 illustrates a cross-section of a brake piston including a core according to the teachings.

FIG. 2 illustrates a cross-section of the brake piston 10. The brake piston 10 includes an open end 18 opposing a closed end 20. The brake piston 10 includes a piston cylindrical wall 12 which extends from and connects the closed end 20 to the open end 18. The piston cylindrical wall 12 includes an exterior wall 22. The exterior wall 22 is located about a periphery of the brake piston 10. The exterior wall 22 connects the closed end 20 to the open end 18. The brake piston cylindrical wall 12 includes an interior wall 24. The interior wall 24 forms a hollow bore 14. The hollow bore 14 extends from the open end 18 toward the closed end 20. The interior wall 14 includes a bore end wall 30 located between the closed end 20 and the open end 18. The length of the hollow bore 14 is the distance from the bore end wall 30 to the open end 18. The brake piston 10 further includes a core member 16. The core member 16 is located within the piston cylindrical wall 12. The core member 16 extends from between the closed end 20 to the open end 18. The core member 16 includes a closed end support portion 26. The closed end support portion is adjacent to and in between the closed end 20 and the bore end wall 30. The core member 16 includes a core cylindrical wall 28. The core cylindrical wall 28 extends from the closed end support portion 26 toward the open end 18. The core cylindrical wall 28 is located between the exterior wall 22 and the interior wall 24. The core cylindrical wall 28 partially surrounds the hollow bore 14. The core cylindrical wall 28 has a length $L_1$ measured from the closed end support portion 26 to an opposing end 29 of the core cylindrical wall 28. The length $L_1$ of the core cylindrical wall 28 is such that it is distanced from the open end 18 by a distance $L_2$ and is free of contact with the open end 18.

Figure 3:
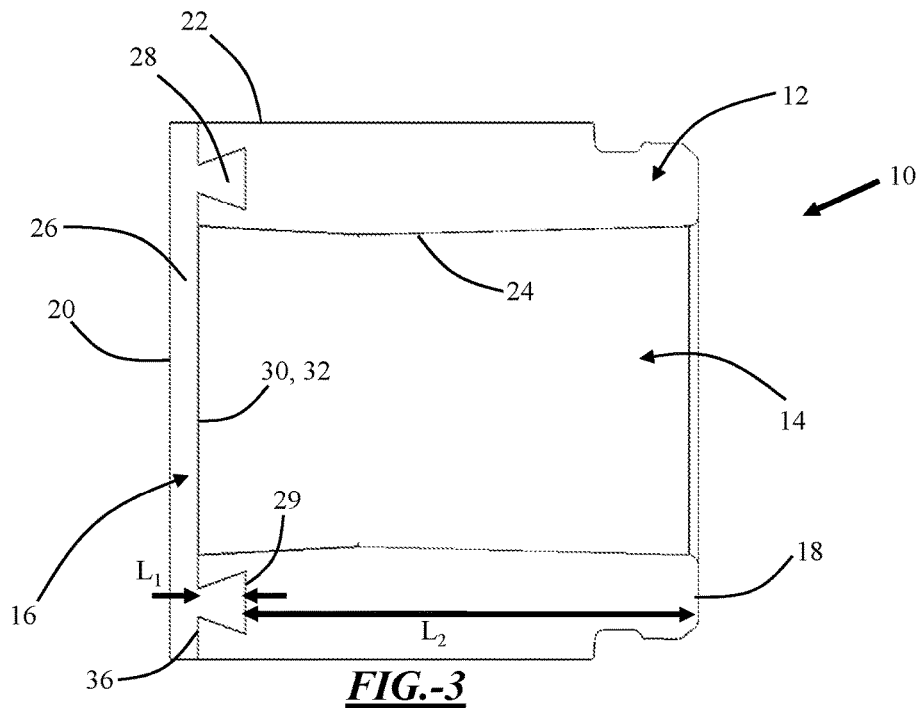
FIG. 3 illustrates a cross-section of a brake piston with a core at a closed end according to the teachings.

FIG. 3 illustrates a cross-section of the brake piston 10. The brake piston 10 includes an open end 18 opposing a closed end 20. The brake piston 10 includes a piston cylindrical wall 12 which extends from the closed end 20 to the open end 18. The piston cylindrical wall 12 includes an exterior wall 22. The exterior wall 22 is located about a periphery of the brake piston 10. The brake piston cylindrical wall 12 includes an interior wall 24. The interior wall 24 forms a hollow bore 14. The hollow bore 14 extends from the open end 18 to the closed end 20. The brake piston includes a core member 16. The core member 16 includes a closed end support portion 26. An inwardly facing surface 32 of the closed end support portion facing toward the hollow bore 14 forms a bore end wall 30. The length of the hollow bore 14 is the distance from the bore end wall 30 to the open end 18. Projecting orthogonally from the closed end support portion 26 is a core cylindrical wall 28. The core cylindrical wall 28 projects into the piston cylindrical wall 12. The core cylindrical wall 28 is located between the exterior wall 22 and the interior wall 24. The core cylindrical wall 28 partially surrounds the hollow bore 14. The core cylindrical wall 28 has a length $L_1$ measured from the closed end support portion 26 to an opposing end 29 of the core cylindrical wall 28. The length $L_1$ of the core cylindrical wall 28 is such that it is distanced from the open end 18 by a distance $L_2$ and is free of contact with the open end 18.

Figure 4:
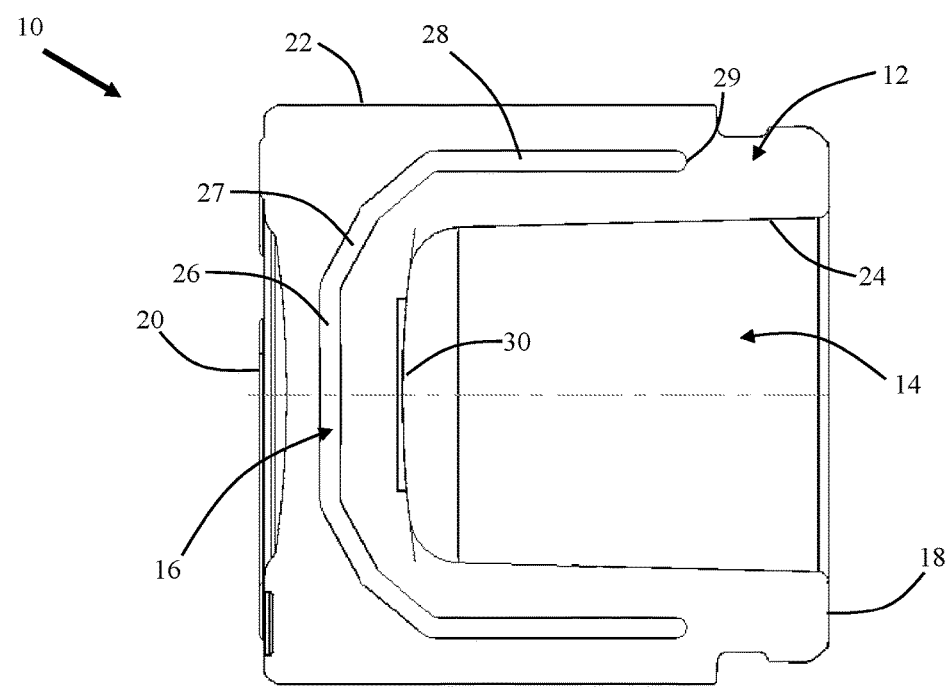
FIG. 4 illustrates a cross-section of a brake piston including a core according to the teachings.

FIG. 4 illustrates a cross-section of the brake piston 10. The brake piston 10 includes an open end 18 opposing a closed end 20. The brake piston 10 includes a piston cylindrical wall 12 which extends from and connects the closed end 20 to the open end 18. The cylindrical wall 12 includes an exterior wall 22 and an interior wall 24. The interior wall 24 forms a hollow bore 14 which extends from the open end 18 toward the closed end 20. The interior wall 14 includes a bore end wall 30 located between the closed end 20 and the open end 18. The brake piston 10 further includes a core member 16. The core member 16 is located within the piston cylindrical wall 12. The core member 16 extends from between the closed end 20 to the open end 18. The core member 16 includes a closed end support portion 26. The closed end support portion 26 is adjacent to and in between the closed end 20 and the bore end wall 30. A connection segment 27 projects from the closed end support portion 26. A core cylindrical wall 28 extends from the connection segment 27 such that the core cylindrical wall 28 is substantially orthogonal relative to the closed end support portion 26. The core cylindrical wall 28 extends from the closed end support portion 26 toward the open end 18. The core cylindrical wall 28 is located between the exterior wall 22 and the interior wall 24. The core cylindrical wall 28 partially surrounds the hollow bore 14 and is free of contact with the open end 18.

Figure 5A:
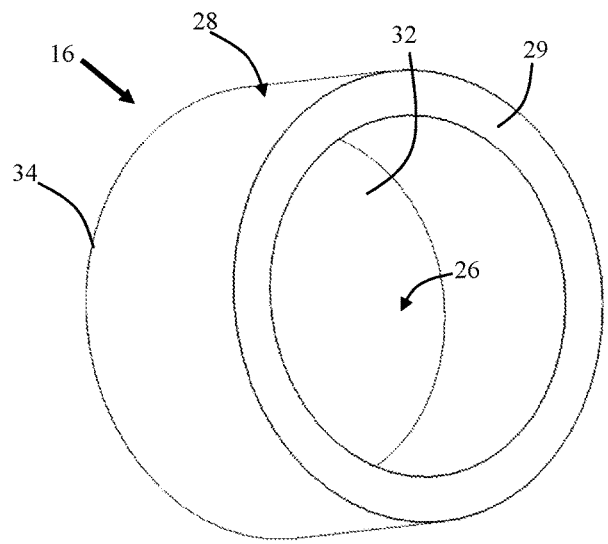
FIG. 5a is a perspective view of a core member for structurally reinforcing a brake piston according to the teachings.
Figure 5B:
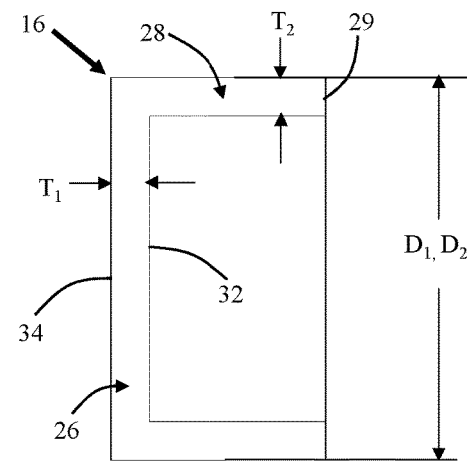

FIG. 5a is a perspective view of a core member 16 and FIG. 5b is a cross-section view of FIG. 5a. The core member 16 includes a closed end support section 26. The closed end support section 26 has a generally disc-like shape. The closed end support section 26 has two opposing faces 32, 34. The closed end support section 26 has a thickness $T_1$. The thickness is the distance between the two opposing faces 32, 34. The closed end support section 26 also has a diameter $D_1$. The core member 16 further includes a core cylindrical wall 28. The core cylindrical wall 28 projects orthogonally from the closed end support section 26. The core cylindrical wall 28 includes an end 29 opposite the inwardly facing surface 32. The core cylindrical wall 28 has a thickness $T_2$. The thickness $T_2$ is the thickness of the core cylindrical wall 28. The thickness $T_2$ is substantially constant along the length of the core cylindrical wall 28. The core cylindrical wall 28 includes a diameter $D_2$. The diameter $D_2$ of the core cylindrical wall 28 is substantially equal to the diameter $D_1$ of the closed end support section 26.

Figure 6A:
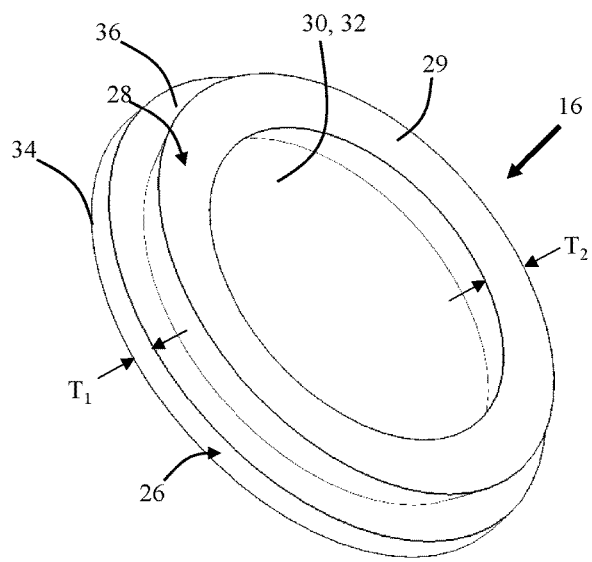
FIG. 6a is a perspective view of a core member which forms a closed end of a brake piston according to the teachings.
Figure 6B:
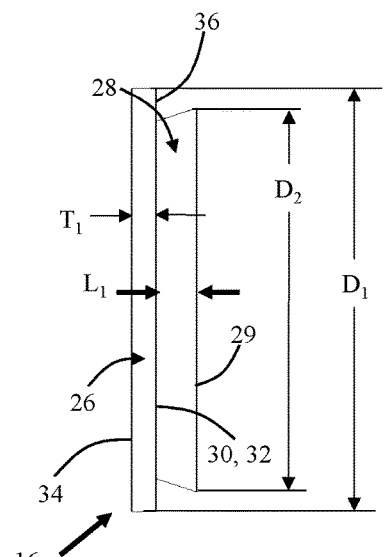

FIG. 6a is a perspective view of a core member 16 and FIG. 6b is a side view of FIG. 6a. The core member includes a closed end support section 26. The closed end support section 26 has a generally disc-like shape. The closed end support section 26 forms the closed end 20 (not shown) of a brake piston 10 (not shown). The closed end support section 26 has two opposing faces 32, 34. One of the faces is an inwardly facing surface 32 which is adjacent the piston cylindrical wall 12 (not shown) and forms the bore end wall 30. The closed end support section 26 has a thickness $T_1$. The thickness $T_1$ is measured as the distance between the two opposing faces 32, 34. The closed end support section 26 also has a diameter $D_1$. The core member 16 further includes a core cylindrical wall 28. The core cylindrical wall 28 projects generally orthogonally from the inwardly facing surface 32 of the closed end support section 26. The core cylindrical wall 28 includes an end 29 opposite the inwardly facing surface 32. The core cylindrical wall 28 has a thickness $T_2$. The thickness $T_2$ widens from the inwardly facing surface 32 to the opposing end 29. The core cylindrical wall 28 includes a diameter $D_2$. The diameter $D_2$ of the core cylindrical wall 28 is smaller than the diameter $D_1$ of the closed end support section 26. The difference in the diameters provides for an outer flange 36 of the closed end support section 26. This outer flange 36 is in direct contact with the piston cylindrical wall 12 (not shown).

Figure 7A:
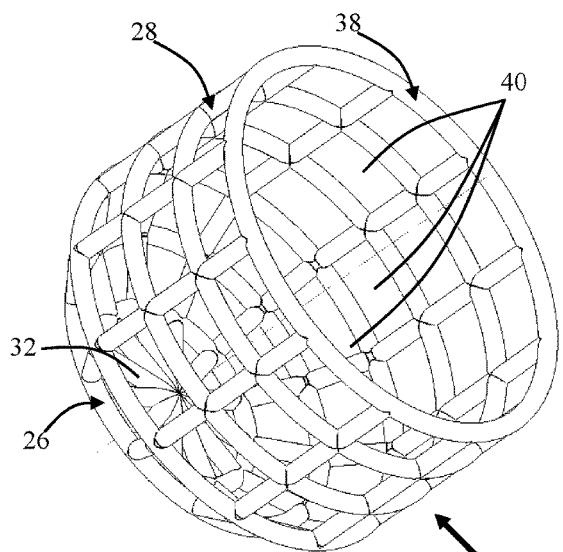
FIG. 7a is a perspective view of a core member having a mesh structure according to the teachings.
Figure 7B:
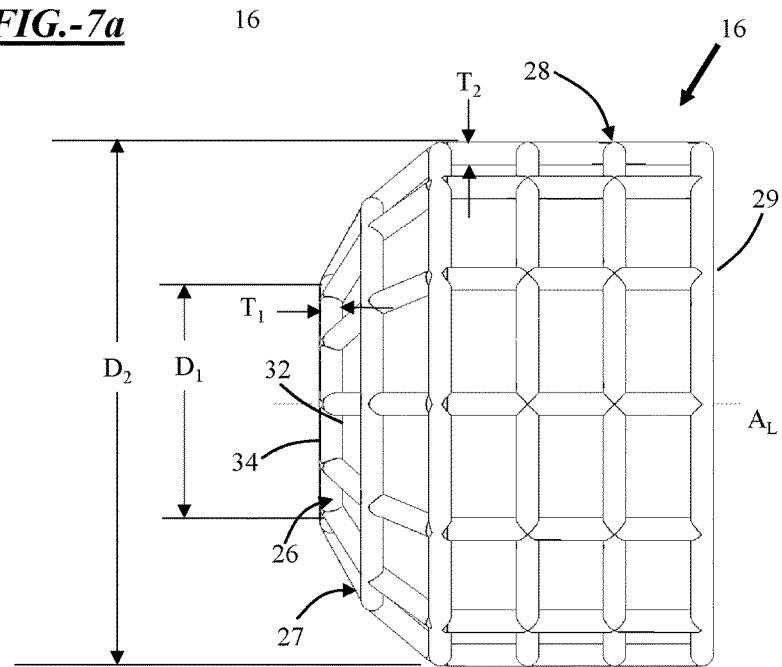

FIG. 7a is a perspective view of a core member 16 and FIG. 7b is a side view of FIG. 7a. The core member 16 includes a mesh-like structure 38 having a plurality of openings 40. The core member 16 includes a closed end support section 26. The closed end support section 26 has a generally disc-like shape. The closed end support section 26 has two opposing faces 32, 34. The closed end support section 26 has a thickness $T_1$. The thickness $T_1$ is the distance between the two opposing faces 32, 34. The closed end support section 26 also has a diameter $D_1$. A connection segment 27 projects from the closed end support portion 26 at an angle away from the longitudinal axis $A_L$. A core cylindrical wall 28 extends from the connection segment 27 such that the core cylindrical wall 28 is substantially orthogonal relative to the closed end support portion 26. The core cylindrical wall 28 includes an end 29 opposite the inwardly facing surface 32. The core cylindrical wall 28 has a thickness $T_2$. The thickness $T_2$ is the thickness of the core cylindrical wall 28. The core cylindrical wall 28 includes a diameter $D_2$. The diameter $D_2$ of the core cylindrical wall 28 is larger than the diameter $D_1$ of the closed end support section 26.

REFERENCE NUMERAL LISTING

10 Brake piston
12 Piston cylindrical wall
14 Hollow bore
16 Core member
18 Open end
20 Closed end
22 Exterior wall
24 Interior wall
26 Closed end support portion
27 Connection segment
28 Core cylindrical wall
29 End of core
30 Bore end wall
32 Inwardly facing surface
34 Surface opposing inwardly facing surface
36 Flange
38 Mesh-like structure
40 Openings
100 Brake assembly
104 Caliper body
105 Piston bore
106 Brake fluid
108 Inner brake pad
110 Outer brake pad
$D_1$ Diameter of closed end support portion
$D_2$ Diameter of core cylindrical wall
$T_1$ thickness of closed end support portion
$T_2$ thickness of core cylindrical wall
$L_1$ Length of core cylindrical wall
$L_2$ Distance from core end to open end
$A_L$ Longitudinal axis As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for aid purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A brake assembly comprising:
a) a brake pad;
b) a brake fluid within a caliper body;
c) a brake piston in contact with both the brake pad and the brake fluid, the brake piston including:
    i) an open end in contact with the brake pad and adapted for transferring a brake apply force to the brake pad;
    ii) a closed end in contact with the brake fluid and adapted for receiving the brake apply force from the brake fluid;
    iii) a piston cylindrical wall comprising a polymeric material which extends from a closed end to an open end of the piston cylindrical wall; wherein the piston cylindrical wall includes an exterior wall, an interior wall which forms a wall of a hollow bore, and a wall thickness which is a distance between the exterior wall and the interior wall;
    iv) a core member comprising a metallic material located within the piston cylindrical wall which extends between the closed end and the open end without extending completely to the open end;
    wherein the core member structurally reinforces the brake piston when transferring and receiving the brake force; and
    wherein the core member includes a core cylindrical wall which at least partially encircles the hollow bore and is completely embedded within the wall thickness of the piston cylindrical wall.

2. The brake assembly of claim 1, wherein the polymeric material includes a phenolic resin so that the core member is located within the wall thickness of the piston cylindrical wall which includes the phenolic resin.

3. A brake assembly comprising:
a) a brake pad;
b) a brake fluid within a caliper body;
c) a brake piston in contact with both the brake pad and the brake fluid, the brake piston including;
    i) an open end in contact with the brake pad and adapted for transferring a brake apply force to the brake pad;
    ii) a closed end in contact with the brake fluid and adapted for receiving the brake apply force from the brake fluid;
    iii) a piston cylindrical wall comprising a phenolic resin which extends from the closed end to the open end;
    iv) a core member comprising a metallic material and having a mesh structure located within the piston cylindrical wall, which includes:
        a closed end support portion which is integral with or adjacent to the closed end; and
        a core cylindrical wall which extends from the closed end support portion toward the open end and is entirely embedded within a wall thickness of the piston cylindrical wall comprising the phenolic resin;
    wherein the core member is free of contact with the open end; and
    wherein the core member structurally reinforces the brake piston.

4. The brake assembly of claim 3, wherein the metallic material includes an iron, a steel, an aluminum, or any combination thereof.

5. The brake assembly of claim 4, wherein the closed end support portion has a generally disc-like shape and has a thickness from about 1 mm to about 15 mm.

6. The brake assembly of claim 5, wherein the core cylindrical wall has a length such that it is distanced from the open end from about at least 8 mm so that the core member is free of contact with the open end.

7. The brake assembly of claim 6, wherein the brake piston is part of a disc brake assembly.

8. The brake assembly of claim 3, wherein the piston cylindrical wall includes an exterior wall, an interior wall which forms an entirety of a wall of a hollow bore, and the wall thickness is a distance between the exterior wall and the interior wall.

9. A brake assembly comprising:
a) a brake pad;
b) a brake fluid within a caliper body;
c) a brake piston in contact with both the brake pad and the brake fluid; the brake piston including:
    (i) an open end in contact with the brake pad and adapted for transferring a brake apply force to the brake pad;

(ii) a closed end in contact with the brake fluid and adapted for receiving the brake apply force from the brake fluid;

(iii) a piston cylindrical wall comprising a phenolic resin which extends from the closed end to the open end, wherein the piston cylindrical wall includes an exterior wall, an interior wall which forms a wall of a hollow bore, and a wall thickness which is a distance between the exterior wall and the interior wall and includes the phenolic resin; and (iv) a core member comprising a metallic material located within the piston cylindrical wall which extends between the closed end and the open end without extending completely to the open end, and wherein the core member includes a core cylindrical wall which at least partially encircles the hollow bore and is completely embedded within the wall thickness of the piston cylindrical wall;

wherein the core member structurally reinforces the brake piston when transferring and receiving the brake apply force; and wherein the brake assembly is a disc brake assembly.

10. The brake assembly of claim 9, wherein the metallic material includes a steel, an iron, an aluminum, or any combination thereof.

11. The brake assembly of claim 10, wherein the core member includes a closed end support portion which is integral with or adjacent to the closed end.

12. The brake assembly of claim 11, wherein the closed end support portion is the closed end of the brake piston.

13. The brake assembly of claim 11, wherein the closed end support portion has a generally disc-like shape.

14. The brake assembly of claim 13, wherein the core cylindrical wall extends from the closed end support portion toward the open end.

15. The brake assembly of claim 14, wherein the exterior wall connects the open end to the closed end; and wherein the interior wall forms an entirety of the wall of the hollow bore and extends from the open end toward the closed end.

16. The brake assembly of claim 14, wherein the core cylindrical wall has a length such that it is distanced from the open end by at least about 8 mm so that the core member is free of contact with the open end.

17. The brake assembly of claim 16, wherein the core member is solid, includes one or more openings, or both.

18. The brake assembly of claim 17, wherein the core member has a mesh structure.

19. The brake assembly of claim 16, wherein the closed end support portion of the core member has a thickness from about 1 mm to about 20 mm.

20. The brake assembly of claim 19, wherein the core cylindrical wall of the core member has a thickness from about 1 mm to about 6 mm.

* * * * *